United States Patent [19]

Kucharczyk et al.

[11] Patent Number: 4,675,975
[45] Date of Patent: Jun. 30, 1987

[54] COMBINATION PLANING AND FINISHING TOOL

[76] Inventors: Peter P. Kucharczyk, 833 Strecker Rd., Chesterfield, Mo. 63017; Richard Hahn, 1111 S. McKnight Rd., Richmond Heights, Mo. 63117

[21] Appl. No.: 803,396

[22] Filed: Dec. 2, 1985

[51] Int. Cl.⁴ ............................................. B27G 13/08
[52] U.S. Cl. ........................ 29/566; 51/5 C; 51/181 R; 51/407; 144/38; 144/219; 144/229; 407/1; 407/34; 407/48
[58] Field of Search .................. 144/38, 229, 218, 219, 144/220; 407/1, 34, 113, 40, 48; 51/5 C, 181 R, 406, 407; 29/566

[56] References Cited

U.S. PATENT DOCUMENTS

| | | | |
|---|---|---|---|
| 330,260 | 11/1885 | Patten | 144/219 |
| 479,332 | 7/1892 | Patten | 144/38 |
| 1,284,092 | 11/1918 | Gray | 144/38 |
| 2,286,208 | 6/1942 | Kirchner | 51/406 |
| 2,785,713 | 3/1957 | Wagner | 144/219 |
| 2,805,695 | 9/1957 | Hoheisel | 144/219 |
| 4,293,254 | 10/1981 | Markovics | 407/40 |
| 4,519,731 | 5/1985 | Vester et al. | 407/48 |

*Primary Examiner*—Nicholas P. Godici
*Assistant Examiner*—Jerry Kearns
*Attorney, Agent, or Firm*—Cohn, Powell & Hind

[57] ABSTRACT

This combination tool (10) includes a body (12) attachable to a drill press (16) by means of a shaft (14). The body includes an end face (34) for attachment of an abrasive finishing disc (36) and provides a mounting for cutter inserts (40). Each cutter insert includes a horizontal cutting edge (46') and a vertical cutting edge (48'). The cutter inserts (40) are generally rectangular and are mounted to vertical abutment bearing faces (52) on the body, utilizing a single fastener (56).

14 Claims, 4 Drawing Figures

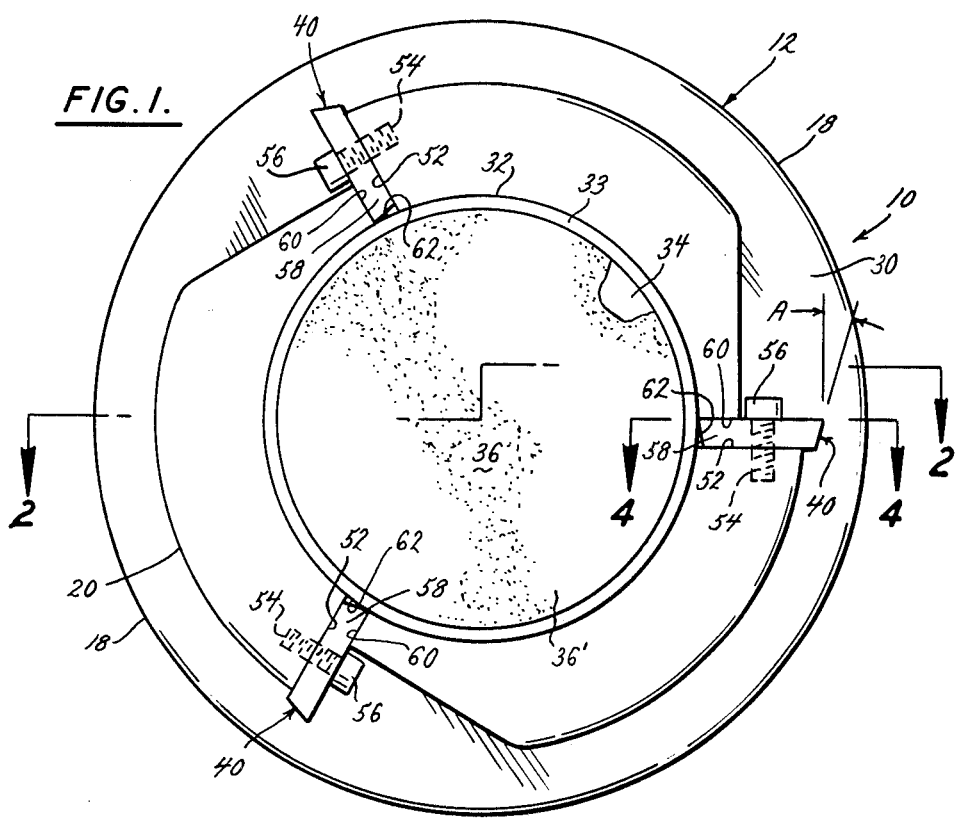
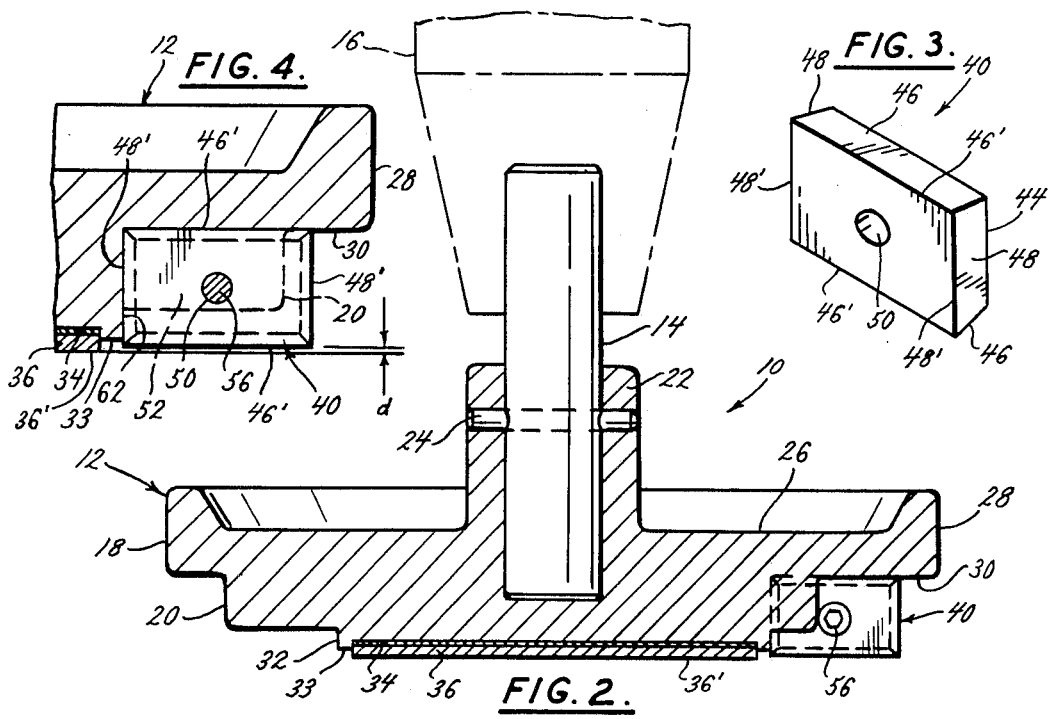

COMBINATION PLANING AND FINISHING TOOL

BACKGROUND OF THE INVENTION

This invention relates generally to a combination tool for a drill press and particularly to a tool having cutter inserts providing a planing operation and an abrasive disc providing a finishing operation.

The use of combination tools which provide more than one machining function is well known and there are several examples of such tools in the prior art. For example, U.S. Pat. No. 479,332 discloses a combined cutting and scouring device. This device teaches the use of two types of outstanding peripheral cutting edges, which operate in the manner of a circular saw, combined with the use of a sandpaper disc having a finishing plane perpendicular to the cutting edges of the cutters. The sandpaper is held in place by a removable ring and is intended to smooth the relatively rough cut surface resulting from the circular saw action. However, this method of holding the sandpaper in place results in an undesirable circumferential wearing edge. In addition the perpendicular relationship between the cutting plane and the abrasive plane is not believed to be conducive to the production of a superior finished surface.

Also of interest are U.S. Pat. No. 1,284,092 and U.S. Pat. No. 1,358,148. The first of these references discloses a woodworking machine providing an annular disc mounting non-radially aligned, angled cutters for coarse machining and a circular disc mounting a triangularly arranged set of rasp elements for fine machining, the face of the rasps being adjustable relative to the cutter edges. The second reference, having the same inventive entity as the first, is an improvement in that in lieu of the rasps used for fine machining the use of a second set of angled scrapers is contemplated, the scrapers being adjustable relative to the cutters. These devices require complicated, and therefore expensive, adjustably related parts and the possibility of maladjustment is not condusive to the production of a superior finished surface.

The present tool overcomes these and other problems in a manner not disclosed by the known prior art.

SUMMARY OF THE INVENTION

This combination tool is used in conjunction with a drill press and provides a means of finely finishing wood and other materials, using cutter inserts for coarse machining and an abrasive disc for fine machining, without the need for adjustment of the disc or inserts.

The plane of the abrasive action is disposed a predetermined distance outwardly of the plane of the cutting action which assists in holding the workpiece in place and permits the finishing not only of hard woods such as walnut, but soft woods such as balsa and other soft materials such as styrofoam plastic.

The inserts, which provide coarse machining, are held in place by a single fastener to facilitate removal and replacement. In addition, the inserts are double-edged to provide alternative machining edges and thereby prolong the life of the inserts.

This combination planing and finishing tool includes a shaft having an axis of rotation; a body attached to the shaft and having a substantially flat end face rotatable about the axis of the shaft and having a plurality of circumferentially spaced mounting means; a plurality of replaceable cutter inserts, each having at least one cutting edge, mounted to the body with the cutting edge extending beyond the end face to define a coaxial cutting plane disposed in perpendicular relation to the axis of rotation, and a replacable abrasive disc attached to the end face and providing a finishing plane disposed parallel to and axially outwardly of the insert cutting plane.

It is an aspect of this invention to provide each of the cutter inserts with a side cutting edge disposed in substantially parallel relation to the axis of rotation to facilitate the machining action.

It is another aspect of this invention to provide that the body includes a peripheral edge and to provide that the inserts are disposed inwardly of said peripheral edge to reduce the cutting force applied to the extremities of the insert.

It is another aspect of this invention to provide that each insert is generally rectangular and of uniform thickness and includes opposed front and rear faces, opposed upper and lower faces, and opposed side faces. Yet another aspect of this invention is to provide that the rectangular insert has two horizontal cutting edges and two vertical cutting edges so that the inserts can be rotated through one hundred and eighty degrees (180°) to provide alternative lower and side cutting edges. This rotational capability increases the life of the insert in the event that one edge becomes chipped.

It is still another aspect of this invention to provide that each mounting means includes a bearing face and a single fastener mounting the insert to the body with the rear face of the insert engageable with the bearing face, the cutting edge being radially disposed.

Still another aspect of the invention is to provide that the mounting means includes at least one bearing face engageable by at least one edge of an associated insert to substantially preclude rotation of the insert about the fastener.

Another aspect of this invention is to provide that the body includes generally circular inner and outer portions, said inner portion having an underface and said outer portion being diametrically smaller than said inner portion and being notched to define a bearing face providing at least part of the mounting means and engageably receiving the rear face of an associated insert, so that the insert is directed substantially parallel to the axis of the shaft.

Still another aspect of the invention is to provide that the body inner portion includes slotted portions adjacent each bearing face and receiving the front face of the inserts in overlapping relation to resist cutting forces applied to the insert horizontal and vertical edges.

BRIEF DESCRIPTION OF THE DRAWINGS

FIG. 1 is a view of the underside of the combination tool;

FIG. 2 is a cross section thereof taken on line 2—2 of FIG. 1;

FIG. 3 is an enlarged perspective view of a carbide insert, and

FIG. 4 is an enlarged section taken on line 4—4 of FIG. 1.

DESCRIPTION OF THE PREFERRED EMBODIMENT

Referring now by reference numerals to the drawings and first to FIGS. 1 and 2, it will be understood that the combination tool generally indicated by numeral 10 includes a body 12, attached to a shaft 14 which is received by the chuck 16 of the drill press, shown in phantom outline. The body 12 carries both cutting means and finishing means as will now be described.

The body 12, which in the embodiment shown is of die-cast zinc, includes a circular inner portion 18 and a generally circular outer portion 20 of reduced diameter. The body inner portion 18 includes a hub 22 to which the shaft 14 is attached as by pin 24. The inner portion 18 is recessed at 26 to reduce weight and includes a peripheral edge 28 and a flat underface generally indicated by numeral 30.

The body outer portion 20 includes a reduced diameter end portion 32 which is recessed to provide a circular flat face 34. The recessed face 34 receives the adhesive face of a pressure sensitive attached abrasive disc 36, which is centrally mounted for rotation about the axis of the shaft 14. In the embodiment shown a 50 grit abrasive disc is used which provides a superior finishing means for the material being worked. An emery cloth abrasive disc having a thickness of about 1.5 mm used with a rim of 0.6 mm provides a suitable projection of the face of the disc byond the rim 33 defining the recessed face 34. The radius of the recessed face 34 is about 1.5–2.0 mm greater than the radius of the abrasive disc 36 which facilitates centering of the disc.

The body outer portion 20 also carries a planing or cutting means in the form of a plurality of cutter inserts 40, three in number in the embodiment shown, and mounted to the body at circumferentially spaced intervals of one hundred and twenty degrees (120°) as will be described.

The cutter inserts, which are best shown in FIG. 3, are generally rectangular, of substantially uniform thickness, and include opposed front and rear faces 42 and 44, opposed upper and lower inclined faces 46 and opposed inclined side faces 48. In the embodiment shown, the rearward angle of inclination A of the upper and lower faces 46 and the side faces 48 is between ten and thirty degrees (10°–30°) and an angle of twenty-five degrees (25°) will provide excellent results. The upper and lower faces 46 and the side faces 48 cooperate with the front face 42 to define two sets of carbide cutting edges 46' and 48' respectively disposed in perpendicular relation to each other. The inserts 40 are provided with a centrally disposed fastener receiving aperture 50 for mounting to the body 12 as will now be described with respect to one insert, said other inserts being identical.

In order to mount the inserts 40 securely to the body 12 the outer body portion 20 is notched and slotted to provide a rear abutment bearing face 52 parallel to the axis of rotation which receives the insert rear face 44 in bearing engagement. The bearing face 52 is provided with a threaded opening 54 to receive a fastener such as a socket screw 56. The slot 58 provides an overlapping front abutment bearing face 60 which receives the insert front face 42 in bearing engagement. As best shown in FIG. 4 the slot 58 also provides a side bearing face 62 which cooperates with the underface 30 of the body inner portion 18 to provide a stop means precluding rotation of the insert 40 about the fastener 56. To this end, it will be understood that any tendency for the insert 40 to rotate will be resisted by engagement between the body underside 30 and the insert upper edge 46' and by engagement between the slot side 62 and the insert side edge 48' as indicated in FIG. 4. It will be understood that there is a minimum amount of play between engageable edges 46' and 48' and faces 30 and 62, which in the embodiment shown is of the order of 0.1 mm. When mounted the operating insert cutting edge is disposed substantially radially relative to the axis of the shaft 14.

The circular finishing plane defined by the abrasive disc outer face 36', and the annular cutting plane defined by the insert lower cutting edges 46' are parallel to each other and perpendicular to the axis of rotation of the tool 10. In the embodiment shown the lower cutting edge 46' extends beyond the recessed face 34 about 1.0 mm which provides a suitable projection beyond the rim 33 defining the recessed face 34. Importantly, and as shown in FIG. 2, these parallel planes are spaced apart a distance d which, in the embodiment shown, is 0.5 mm and which will work well within the range of 0.5 mm to 1.0 mm depending on the thickness of the abrasive disc 36 and the disposition of the lower cutting edge 46'. Because of this arrangement, by which the abrasive plane is disposed axially outwardly of the cutting plane, the work is held in place and only a small thickness of material is left to be finished as the workpiece passes under the tool creating a finished path having a width equal to the diameter of the tool as defined by the vertical edge 48', which is perpendicular to the horizontal edge 46', and provides assistance in the cutting process. In the embodiment shown the diameter of the disc 36 is about 5.3 cm and the length of the insert lower cutting edge 46' is about 1.5 cm providing a ratio in excess of three to one (3:1).

As shown in FIG. 2, insert 40 is disposed radially outwardly of the abrasive disc but radially inwardly of the body portion circular edge 28. Because of this there is no extended radial projection of the inserts beyond the limits of the body 12. As shown, the inserts 40 project only a short distance beyond the abutment provided by bearing face 52 and is thereby securely seated in position. Further, the provision of the overlapping slot front face 60 tends to resist forces applied to the horizontal and vertical cutting edges 46' and 48' as they perform their cutting operation.

The operational speed of the preferred embodiment is three thousand five hundred revolutions per minute (3500 r.p.m.) and it will be understood that at this speed, and with a cutting diameter of 8.5 cm this represents a maximum linear speed of the cutting edges in excess of fifteen hundred cm per second (1.5 c.p.s.). At these speeds it has been found that the tools run efficiently without undue heating.

The symmetrical nature of the inserts 40 provides that when the operating horizontal and vertical edges 46' and 48' respectively become dulled the inserts can be removed, rotated through one hundred and eight degrees (180°) and replaced, this operation being considerably facilitated by the need to remove only the single fastener 56. The abrasive disc 36 is removed by peeling from the recessed face 34, and it will be understood that the disc is substantially the same diametric size as the recess such that the recess sidewalls tend to maintain the disc in place.

Although the tool is intended primarily for planing and finishing wood, and particularly hard woods such as walnut, it can also be used on much softer materials such as balsa woods and even styrofoam because of the high quality of the cutting and finishing action.

The improved capability of this combination tool to plane and finish wood results from its combined action of cutting and fine sanding which enables the tool to provide veneers as thin as 1.5 mm. This capability is due, at least in part, to the fact that sanding occurs almost immediately after the rough cut is made. Further, the provision of a circular finishing plane which extends beyond the parallel cutting plane assists in keeping the work flat and in place even when relatively large knots are encountered. This arrangement has also proved to be economical with respect to the long life experienced by the abrasive disc of up to sixty hours.

In view of the above it will be seen that various aspects and features of the invention are achieved and other advantageous results attained. While a perferred embodiment of the invention has been shown and described, it will be clear to those skilled in the art that changes and modifications may be made therein without departing from the invention in its broader aspect.

We claim as our invention:

1. A combination planing and finishing tool for use in a drill press, the tool comprising:
   (a) a shaft including an axis of rotation,
   (b) a body attached to the shaft and including a substantially flat end face disposed in perpendicular relation to and rotatable about the axis of the shaft and a plurality of circumferentially spaced mounting means,
   (c) a plurality of replaceable cutter inserts each having at least one cutting edge, said inserts being mounted to associated mounting means with the cutting edge extending beyond the end face to define a cutting plane disposed in perpendicular relation to the axis of rotation, and
   (d) a replaceable abrasive disc operatively attached to the end face and providing a finishing plane disposed parallel to and axially outwardly of the insert cutting plane.

2. A combination tool as defined in claim 1, in which:
   (e) each cutter insert includes a side cutting edge disposed in substantially perpendicular relation to said one cutting edge.

3. A combination tool as defined in claim 2, in which:
   (f) the body includes a peripheral edge axially spaced from the end face, and
   (g) the side cutting edge is disposed radially inwardly of said peripheral edge.

4. A combination tool as defined in claim 1, in which:
   (e) each insert is generally rectangular and of substantially uniform thickness and includes opposed front and rear faces, opposed upper and lower faces, and opposed side faces providing at least one horizontal cutting edge and at least one vertical cutting edge.

5. A combination tool as defined in claim 4, in which:
   (f) each mounting means includes a bearing face and a single fastener means mounting the insert to the body with the rear face of the insert engageable with the bearing face with the horizontal cutting edge substantially radially disposed relative to the axis of the shaft.

6. A Combination tool as defined in claim 5, in which:
   (g) each mounting means includes at least one horizontal bearing face engageable by at least one horizontal cutting edge of an associated insert to substantially preclude rotation of the insert about the fastening means.

7. A combination tool as defined in claim 4, in which:
   (f) the insert upper and lower faces and both side faces define cutting edges and said inserts are rotatable through one hundred and eighty degrees (180°) to provide alternative lower and side cutting edges.

8. A combination tool as defined in claim 1, in which:
   (e) the replaceable abrasive disc includes an adhesive face attachable to the end face of the body and is of a thickness to provide a finishing plane extending outwardly of the cutting plane substantially 0.5 mm–1.0 mm.

9. A combination tool as defined in claim 1, in which:
   (e) the end face to which the abrasive disc is attached is recessed an amount less than the thickness of the abrasive disc.

10. A combination tool as defined in claim 1, in which:
    (e) three inserts are provided spaced at one hundred and twenty degrees (120°) intervals substantially radially disposed relative to the axis of the shaft.

11. A combination tool as defined in claim 1, in which:
    (e) each insert is generally rectangular and includes opposed front and rear faces, opposed upper and lower faces and opposed side faces,
    (f) the body includes generally circular inner and outer portions,
    (g) said inner portion is attached to the shaft and includes a peripheral edge and an underface, and
    (l) said outer portion is diametrically smaller than said inner portion and is notched to define a bearing face providing at least part of the mounting means and engageably receiving the rear face of an associated insert.

12. A combination tool as defined in claim 11, in which:
    (i) the inserts are mounted inwardly of the peripheral edge of the body inner portion and include opposed upper and lower faces and opposed side faces defining cutting edges, said inserts being rotatable through one hundred and eighty degrees to provide alternative lower and side cutting edges,
    (j) the body inner portion includes slotted portions adjacent each bearing face and receiving the front face of the inserts in overlapping relation, and
    (k) the mounting means includes a single fastener mounting an associated insert to an associated bearing face and the upper cutting edge of each insert is engageable with the inner body underface to substantially preclude rotation of the insert about the fastener means.

13. A combination tool as defined in claim 1, in which:
    (e) each insert includes a lower cutting edge, and the diameter of the abrasive disc and the length of the insert lower cutting edge are in the proportion of substantially three to one (3:1).

14. A combination tool as defined in claim 4, in which:
    (f) the front face cooperates with the lower face and a side face respectively to define horizontal and vertical cutting edges, said lower and side faces being rearwardly inclined at an angle of substantially between ten and thirty degrees (10°–30°).

* * * * *